United States Patent
Somasundaram et al.

(10) Patent No.: US 8,971,847 B2
(45) Date of Patent: *Mar. 3, 2015

(54) NON-ACCESS STRATUM ARCHITECTURE AND PROTOCOL ENHANCEMENTS FOR LONG TERM EVOLUTION MOBILE UNITS

(71) Applicant: InterDigital Patent Holdings, Inc., Wilmington, DE (US)

(72) Inventors: Shankar Somasundaram, Sunnyvale, CA (US); Rajat P. Mukherjee, Toronto (CA)

(73) Assignee: InterDigital Patent Holdings, Inc., Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 14/021,436

(22) Filed: Sep. 9, 2013

(65) Prior Publication Data

US 2014/0011474 A1 Jan. 9, 2014

Related U.S. Application Data

(63) Continuation of application No. 12/254,265, filed on Oct. 20, 2008, now Pat. No. 8,532,614.

(60) Provisional application No. 60/982,698, filed on Oct. 25, 2007.

(51) Int. Cl.
*H04M 1/66* (2006.01)
*H04W 12/00* (2009.01)
(Continued)

(52) U.S. Cl.
CPC .............. *H04W 12/00* (2013.01); *H04W 12/02* (2013.01); *H04W 12/10* (2013.01); *H04W 80/02* (2013.01)

USPC ......................................................... 455/410

(58) Field of Classification Search
USPC ........................................................ 455/410
See application file for complete search history.

(56) References Cited

U.S. PATENT DOCUMENTS 7,197,145 B2  3/2007  Yi
2004/0258019 A1  12/2004  Haumont et al.
(Continued)

FOREIGN PATENT DOCUMENTS

EP  1 248 487  10/2002
EP  1942626 A1  7/2008

OTHER PUBLICATIONS

Appleton, "The GSM Protocol Stack," pp. 9/1-9/5 (Mar. 1998).
(Continued)

*Primary Examiner* — Kwasi Karikari
(74) *Attorney, Agent, or Firm* — Volpe and Koenig, P.C.

(57) ABSTRACT

A method and apparatus performs processing of the non-access stratus (NAS) layer (layer 3) in long term evolution (LTE) wireless transmit/receive units (WTRUs), which allows the NAS protocol layer to route layer 3 messages to the correct NAS entity, and to encode new NAS message types and information elements. A new architecture is presented that enables NAS security. When a NAS message is generated, a determination is made as to whether or not to cipher, de-cipher and/or integrity check the NAS message based on at least one of a protocol discriminator (PD) of the NAS message, an indicator field in a header of the NAS message, the type of the NAS message, a NAS security state variable, and an indication by an upper layer protocol. The NAS security state variable indicates whether NAS security is currently active or not and may comprise one bit.

24 Claims, 5 Drawing Sheets

(51) Int. Cl.
*H04W 12/02* (2009.01)
*H04W 12/10* (2009.01)
*H04W 80/02* (2009.01)

(56) References Cited

U.S. PATENT DOCUMENTS

| | | | |
|---|---|---|---|
| 2007/0171857 A1 | 7/2007 | Wang et al. | |
| 2008/0137574 A1 | 6/2008 | Jiang | |
| 2008/0181149 A1 | 7/2008 | Jiang | |
| 2008/0188200 A1 | 8/2008 | Forsberg | |
| 2008/0233947 A1* | 9/2008 | Herrero-Veron | 455/422.1 |
| 2009/0025060 A1 | 1/2009 | Mukherjee et al. | |
| 2010/0144313 A1 | 6/2010 | Chun et al. | |
| 2010/0235634 A1* | 9/2010 | Fischer | 713/168 |
| 2010/0293372 A1 | 11/2010 | Fischer et al. | |

OTHER PUBLICATIONS

Ericsson, "CR to 24.801: NAS signalling security via E-UTRAN," 3GPP TSG CT WG1 Meeting #48, C1-072105 (Aug. 20-24, 2007).
Harkins et al., "Proposal for the IKEv2 Protocol," IPSEC Working Group, Internet Draft (Apr. 2002).
Nokia Siemens Networks, et al., Mobility Management: UE State Model and "IDLE Mode" vs. "IDLE State", 9.2 SAE, Discussion and Approval, 3GPP TSG CT WG1 Meeting #49, C1-072357, (Kobe, Japan, Oct. 8-12, 2007).
Qualcomm Europe, "Section on 'Security Function'," 3GPP TSG SA WG2 Meeting #60, S2-074209 (Oct. 8-12, 2007).
Third Generation Partnership Project, "Technical Specification Group Services and System Aspects; Rationale and Track of Security Decisions in Long Term Evolved (LTE) RAN/3GPP System Architecture Evolution (SAE) (Release 8)", 3GPP TR 33.821 V0.3.0, (May 2007).
Third Generation Partnership Project, "Technical Specification Group Services and System Aspects; Rationale and Track of Security Decisions in Long Term Evolved (LTE) RAN/3GPP System Architecture Evolution (SAE) (Release 8)", 3GPP TR 33.821 V0.8.0, (Apr. 2008).
Third Generation Partnership Project, "Technical Specification Group Core Network and Terminals; Mobile Radio Interface Layer 3 Specification; Core Network Protocols; Stage 3; (Release 7)", 3GPP TS 24.008 V7.6.0, (Dec. 2006).
Third Generation Partnership Project, "Technical Specification Group Core Network and Terminals; Mobile Radio Interface Layer 3 Specification; Core Network Protocols; Stage 3; (Release 7)", 3GPP TS 24.008 V7.9.0, (Sep. 2007).
Third Generation Partnership Project, "Technical Specification Group Core Network and Terminals; Mobile Radio Interface Layer 3 Specification; Core Network Protocols; Stage 3; (Release 8)", 3GPP TS 24.008 V8.3.0, (Sep. 2008).
Third Generation Partnership Project, "Technical Specification Group Core Network and Terminals; Mobile Radio Interface Layer 3 Specification; Core Network Protocols; Stage 3; (Release 7)", 3GPP TS 24.008 V7.13.0 (Sep. 2008).
Third Generation Partnership Project, "Technical Specification Group Core Network; Mobile Radio Interface Signalling Layer 3; General Aspects; (Release 7)", 3GPP TS 24.007 V7.0.0, (Sep. 2005).
Third Generation Partnership Project, "Technical Specification Group Radio Access Network; Radio Link Control (RLC) Protocol Specification; (Release 7)", 3GPP TS 25.322 V7.2.0, (Sep. 2006).
Third Generation Partnership Project, "Technical Specification Group Radio Access Network; Radio Link Control (RLC) Protocol Specification; (Release 7)", 3GPP TS 25.322 V7.4.0, (Sep. 2007).
Third Generation Partnership Project, "Technical Specification Group Radio Access Network; Radio Link Control (RLC) Protocol Specification; (Release 7)", 3GPP TS 25.322 V7.8.0, (Sep. 2008).
Third Generation Partnership Project, "Technical Specification Group Radio Access Network; Radio Link Control (RLC) Protocol Specification; (Release 8)", 3GPP TS 25.322 V8.3.0, (Sep. 2008).
Third Generation Partnership Project, "Technical Specification Group Radio Access Network; Medium Access Control (MAC) Protocol Specification; (Release 7)", 3GPP TS 25.321 V7.3.0, (Dec. 2006).
Third Generation Partnership Project, "Technical Specification Group Radio Access Network; Medium Access Control (MAC) Protocol Specification; (Release 7)", 3GPP TS 25.321 V7.6.0, (Sep. 2007).
Third Generation Partnership Project, "Technical Specification Group Radio Access Network; Medium Access Control (MAC) Protocol Specification; (Release 7)", 3GPP TS 25.321 V7.10.0, (Sep. 2008).
Third Generation Partnership Project, "Technical Specification Group Radio Access Network; Medium Access Control (MAC) Protocol Specification; (Release 8)", 3GPP TS 25.321 V8.3.0, (Sep. 2008).
Third Generation Partnership Project, "Technical Specification Group Core Network and Terminals; 3GPP System Architecture Evolution; CT WG1 Aspects; (Release 8)", 3GPP TR 24.801 V0.4.0, (Oct. 2007).
Third Generation Partnership Project, "Technical Specification Group Core Network and Terminals; 3GPP System Architecture Evolution; CT WG1 Aspects; (Release 8)", 3GPP TR 24.801 V8.0.1, (Oct. 2008).
Third Generation Partnership Project, "Technical Specification Group Radio Access Network; Evolved Universal Terresterial Radio Access (E-UTRA) and Evolved Universal Terrestrial Radio Access Network (E-UTRAN); Overall Description; Stage 2; (Release 8)", 3GPP TS 36.300 V8.2.0, (Sep. 2007).
Third Generation Partnership Project, "Technical Specification Group Radio Access Network; Evolved Universal Terrestrial Radio Access (E-UTRA) and evolved Universal Terrestrial Radio Access Network (E-UTRAN); Overall Description; Stage 2; (Release 8)", 3GPP TS 36.300 V8.6.0, (Sep. 2008).
Third Generation Partnership Project, "Technical Specification Group Services and System Aspects; Rationale and Track of Security Decisions in Long Term Evolved (LTE) RAN/3GPP System Architecture Evolution (SAE) (Release 8)", 3GPP TR 33.821 V0.4.0, (Sep. 2007).
Third Generation Partnership Project, "Technical Specification Group Radio Access Network; Evolved Universal Terrestrial Radio Access (E-UTRA) Packet Data Convergence Protocol (PDCP) specification (Release 8)," 3GPP TS 36.323 V1.0.0 (Oct. 2007).
Third Generation Partnership Project, "Technical Specification Group Radio Access Network; Evolved Universal Terrestrial Radio Access (E-UTRA) Packet Data Convergence Protocol (PDCP) specification (Release 8)," 3GPP TS 36.323 V8.3.0 (Oct. 2008).
Third Generation Partnership Project, "Technical Specification Group Services and System Aspects; 3G Security; Security architecture (Release 8)," 3GPP TS 33.102 V8.0.0 (Jun. 2008).
Third Generation Partnership Project, "Technical Specification Group Services and System Aspects; 3G Security; Security architecture (Release 8)," 3GPP TS 33.102 V7.2.0 (Dec. 2007).
Third Generation Partnership Project, "Technical Specification Group Core Network and Terminals; Non-Access-Stratum (NAS) protocol for Evolved Packet System (EPS); Stage 3 (Release 8)," 3GPP TS 24.301 V1.0.0 (Sep. 2008).
Third Generation Partnership Project, "Technical Specification Group Radio Access Network; Evolved Universal Terrestrial Radio Access (E-UTRA) Radio Resource Control (RRC); Protocol specification (Release 8)," 3GPP TS 36.331 V8.3.0 (Sep. 2008).

* cited by examiner

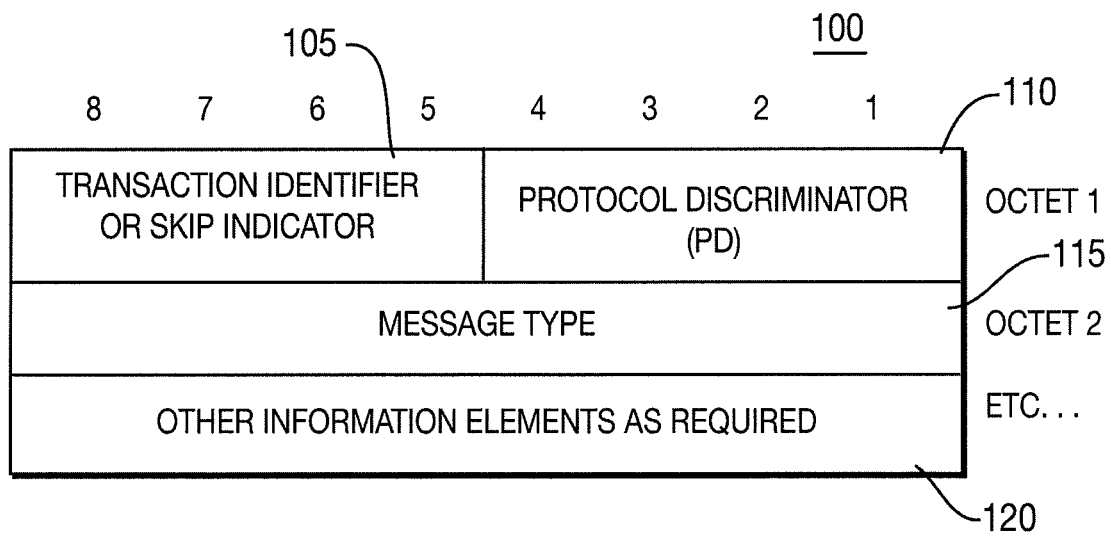

FIG. 1
PRIOR ART

| BITS 4321 | |
|---|---|
| 0 0 0 0 | GROUP CALL CONTROL |
| 0 0 0 1 | BROADCAST CALL CONTROL |
| 0 0 1 0 | RESERVED: WAS ALLOCATED IN EARLIER PHASES OF THE PROTOCOL |
| 0 0 1 1 | CALL CONTROL; CALL RELATED SS MESSAGES |
| 0 1 0 0 | GPRS TRANSPARENT TRANSPORT PROTOCOL (GTTP) |
| 0 1 0 1 | MOBILITY MANAGEMENT MESSAGES |
| 0 1 1 0 | RADIO RESOURCES MANAGEMENT MESSAGES |
| 1 0 0 0 | GPRS MOBILITY MANAGEMENT MESSAGES |
| 1 0 0 1 | SMS MESSAGES |
| 1 0 1 0 | GPRS SESSION MANAGEMENT MESSAGES |
| 1 0 1 1 | NON CALL RELATED SS MESSAGES |
| 1 1 0 0 | LOCATION SERVICES |
| 1 1 1 0 | RESERVED FOR EXTENSION OF THE PD TO ONE OCTET LENGTH |
| 1 1 1 1 | RESERVED FOR TEST PROCEDURES |

FIG. 2
PRIOR ART

| | FORMAT | MEANING | IE INDICATOR (TYPE) PRESENT | LENGTH INDICATOR PRESENT | VALUE INDICATOR PRESENT |
|---|---|---|---|---|---|
| 405 | T | TYPE ONLY | YES | NO | NO |
| 410 | V | VALUE ONLY | NO | NO | YES |
| 415 | TV | TYPE AND VALUE | YES | NO | YES |
| 420 | LV | LENGTH AND VALUE | NO | YES | YES |
| 425 | TLV | TYPE, LENGTH AND VALUE | YES | YES | YES |

*FIG. 4*
PRIOR ART

NON-ACCESS STRATUM ARCHITECTURE AND PROTOCOL ENHANCEMENTS FOR LONG TERM EVOLUTION MOBILE UNITS

CROSS REFERENCE TO RELATED APPLICATION

This application is a continuation of U.S. application Ser. No. 12/254,265 filed Oct. 20, 2008, which claims the benefit of U.S. Provisional Application No. 60/982,698 filed Oct. 25, 2007, which is incorporated by reference as if fully set forth.

FIELD OF INVENTION

This application is related to wireless communications.

BACKGROUND

The current effort for the third generation partnership project (3GPP) long term evolution (LTE) program is to bring new technology, new architecture and new methods related to LTE settings and configurations in order to provide improved spectral efficiency, reduced latency, better utilization of radio resources to bring faster user experiences and richer applications and services with less cost.

The LTE layer 3 (L3) architecture may be considered as an evolution of the existing L3 architecture for a general packet radio service (GPRS) capable wireless transmit/receive unit (WTRU), (i.e., mobile station). LTE defines new mobility management (MM) concepts, (e.g., the concept of tracking areas replacing routing areas), and new MM procedures, (e.g., multiple tracking areas may be allocated in a tracking area update procedure). These new procedures will be described in more detail by new L3 protocols, (e.g., evolved mobility management (EMM)) and evolved session management (ESM)), that will be a part of the LTE non-access stratum (NAS). These new protocol entities are the LTE equivalent of GPRS mobility management (GMM), session management (SM), and the like.

Furthermore, as part of this evolution process, 3GPP will use a different security architecture in LTE than used is in universal mobile telecommunications system (UMTS) and global system for mobile communications (GSM). For the sake of comparison, the UMTS authentication and key agreement (AKA) procedures, (in the packet switched (PS) domain), may be considered to be the baseline for the new LTE procedures. The current UMTS AKA procedures and a brief description of the new LTE security architecture will now be described.

The UMTS AKA and ciphering procedures are spread over multiple protocol layers and use both NAS and radio resource control (RRC) signaling to accomplish their goal. In brief, identification and authentication of a WTRU is accomplished via NAS signaling. Once authentication at a NAS level is accomplished, ciphering and/or integrity protection is activated by the network using a security mode command, which is an RRC message. Once security is activated using the security mode command, the NAS layer in the WTRU first passes a ciphering key (CK) and an integrity key (IK) to the access stratum (AS) using a GMMAS-SECURITY-RESPONSE primitive over the GMMAS service access point (SAP), (defined between the GMM and the AS). The RRC receives these keys and passes them on to the radio link control (RLC) and the medium access control (MAC) using a CRLC-CONFIG primitive, (over the C-SAP between the RRC and RLC) and the CMAC-CONFIG primitive (over the C-SAP between the RRC and MAC). The C-SAP is a service access point for C-plane signaling between the RRC and lower layers. The actual ciphering and integrity protection is usually performed in the RLC, but is performed in the MAC in case of transparent RLC mode traffic. The lower layers, (i.e., MAC/RLC), are responsible for ensuring that messages intended for upper layers, (e.g., L3 NAS messages), have been integrity protected and/or ciphered correctly. If not, the lower layers ignore/drop the message.

For LTE, a radically different architecture for security has been proposed. The main difference is that instead of a single security layer, (i.e., in the MAC/RLC), there are now two levels of security—NAS security and AS security. NAS security terminates in the mobility management entity (MME), (i.e., core network), and the AS security terminates in the base station (i.e., eNode-B). In brief, the AKA procedures are completed in the NAS, the NAS security keys are derived first and upon completion, and the AS security parameters are derived from the NAS keys in a cryptographically separate manner, (i.e., knowledge of AS keys does not allow an attacker to determine the NAS keys). The main rationale for this decision was that in LTE, one might have base stations in vulnerable locations, (e.g., home Node-Bs), and since RRC (and therefore security) is terminated in the base station, this was considered to be a security risk. Hence two levels of security are required.

FIG. 1 shows the structure of a conventional LTE L3 header 100. The first octet of the LTE L3 header 100 includes a transaction identifier or skip indicator field 105 and a protocol discriminator (PD) field 110. The second octet of the LTE L3 header 100 includes a message type field 115. Additional octets of the LTE L3 header 100 may include other information elements 120 as required. As previously described, new L3 protocol entities have been proposed, (e.g., EMM and ESM). However, the current LTE L3 header 100 does not support these new protocols. Specifically, the PD field 110 in the LTE L3 header 100 of FIG. 1 is enhanced to distinguish these new protocols as options.

FIG. 2 shows the PD field 110 of the LTE L3 header 100 of FIG. 1. Referring to FIGS. 1 and 2, the last four bits (4321) of the first octet in the LTE L3 header 100 form the PD field 110, which is used by the routing entity in the MM sub-layer of the NAS to route an L3 message including the LTE L3 header 100 to the appropriate NAS entity, (e.g., MM/GMM/SM currently).

The conventional NAS architecture 300 of a PS-only UMTS WTRU is shown in FIG. 3. The NAS architecture 300 includes a radio access bearer management (RABM) unit 305, a connection management (CM) unit 310, a mobility management (MM) unit 315 and an access stratum (AS) sublayer 320. The RABM unit 305 includes a plurality of radio access bearer (RAB) entities 325, 330 and 335, and an RAB control unit 340. The CM unit 310 includes a session management (SM) unit 345, a GPRS short message service (GSMS) entity 350, and a supplemental service (SS) entity 355. A packet data protocol (PDP) 360 is used as an interface between the CM unit 310 and the MM unit 315. The MM unit 315 includes a GPRS MM (GMM) unit 365 and a PD unit 370. Both the MM unit 315 and the RABM unit 305 interface with the AS sublayer 320, which include a radio resource controller (RRC) 375, a broadcast multicast controller (BMC) 380, and a packet data conversion protocol (PDCP) 385. The AS sublayer 320 provides services to the MM unit 315 and the RABM unit 305. The MM unit 315 provides services to the entities of the CM unit 310.

The RAB control unit 340 adds, modifies, deletes and/or reconfigures the RAB entities 325, 330 and 335. The PD unit 370 is used for routing NAS message information elements (IEs) to various NAS entities. The SM unit 345 provides services to the RABM unit 305 and uses services of the MM unit 315. The GSMS entity 350 is identical to the SMS entity for GPRS services in GSM, except it uses the services from the GMM unit 365. The SS entity 355 is identical to the one for non-GPRS services, except it uses the services from the PS signaling connection. The RABM unit 305 hides the concepts of RABs that can be activated/released while a PDP context is active. If uplink (UL) data in the terminal is to be sent on an RAB (network service access point identifier (NSAPI)) that has been released, the RABM unit 305 will trigger a service request procedure in GMM unit 365.

Usually, NAS message IEs are encoded in type/length/value (TLV) format. As shown in FIG. 4, NAS message IEs belong to one of five types of IEs 405, 410, 415, 420 and 425. As shown in FIG. 4, IE 405 has a type (T) only format, IE 410 has a value (V) only format, IE 415 has a type and value (TV) format, IE 420 has a length and value (LV) format, and IE 425 has a type, length and value (TLV) format. As indicated in FIG. 4, an IE indicator (type) is present in IEs 405, 415 and 425, but is not present in IEs 410 and 420. A length indicator is present in IEs 420 and 425, but is not present in IEs 405, 410 and 415. A value indicator is present in IEs 410, 415, 420 and 425, but is not present in IE 405.

Some of the problems with using the NAS architecture 300 of FIG. 3 is that the new NAS messages proposed do not have any message types defined in order to be identified. Also, some of the expected new NAS IEs have no defined format for their encoding. Furthermore, the NAS entities shown in FIG. 3 do not support security, (i.e., it is difficult to implement security in the LTE NAS using the current NAS architecture).

In addition, in the NAS architecture 300, the ciphering algorithms proposed for LTE are block ciphers, i.e., they work by using the CK and an indication of the length of the protocol data unit (PDU) to be ciphered to generate a keystream block, having a length equal to that of the unciphered PDU. This keystream block is then bitwise added (usually) to the unciphered PDU to generate the ciphered PDU. The procedure is also used at the receiver to generate the identical keystream block for deciphering. This keystream block is then bitwise added to the received ciphered PDU.

In LTE, ciphering of NAS messages has been agreed to. Therefore, the NAS layer has to indicate to the ciphering algorithm the length of the L3 NAS PDU to be ciphered. No functionality exists today for the NAS to do so.

Finally, if relocation of the MME is allowed, then it is possible that during handover an MME relocation may take place. An example of a handover procedure used to carry out the relocation of the MME is shown in FIG. 5. There is currently no procedure defined for the handling of an NAS sequence number (SN) and a hyper frame number (HFN) upon radio link failure and inter-MME handover.

SUMMARY

This application describes the features of an NAS layer (L3) in LTE WTRUs, whereby the NAS protocol layer is allowed to route layer 3 messages to the correct NAS entity, and to encode new NAS message types and information elements. A new architecture is presented that enables NAS security. When a NAS message is generated, a determination is made as to whether or not to cipher, de-cipher and/or integrity check the NAS message based on at least one of a protocol discriminator (PD) of the NAS message, an indicator field in a header of the NAS message, the type of the NAS message, a NAS security state variable, and an indication by an RRC protocol. The NAS security state variable indicates whether NAS security is currently active or not and may comprise one bit.

The NAS protocol layer is allowed to route L3 messages to the correct LTE NAS entity, (e.g., EMM and ESM). The encoding of new NAS message types and new NAS IEs is allowed. A new NAS architecture is provided to enable NAS security and allow the determination of the length of the NAS PDU for generation of a ciphering keystream of equal length. Furthermore, the NAS layer is allowed to handle SN and HFN upon radio link failure and handover.

BRIEF DESCRIPTION OF THE DRAWINGS

A more detailed understanding may be had from the following description, given by way of example and to be understood in conjunction with the accompanying drawings wherein:

FIG. 1 shows the structure of a conventional LTE L3 header;

FIG. 2 shows a PD field of the LTE L3 header of FIG. 1;

FIG. 4 shows the type/length/value (TLV) encoded format of NAS message IEs;

DETAILED DESCRIPTION

Figure 3:
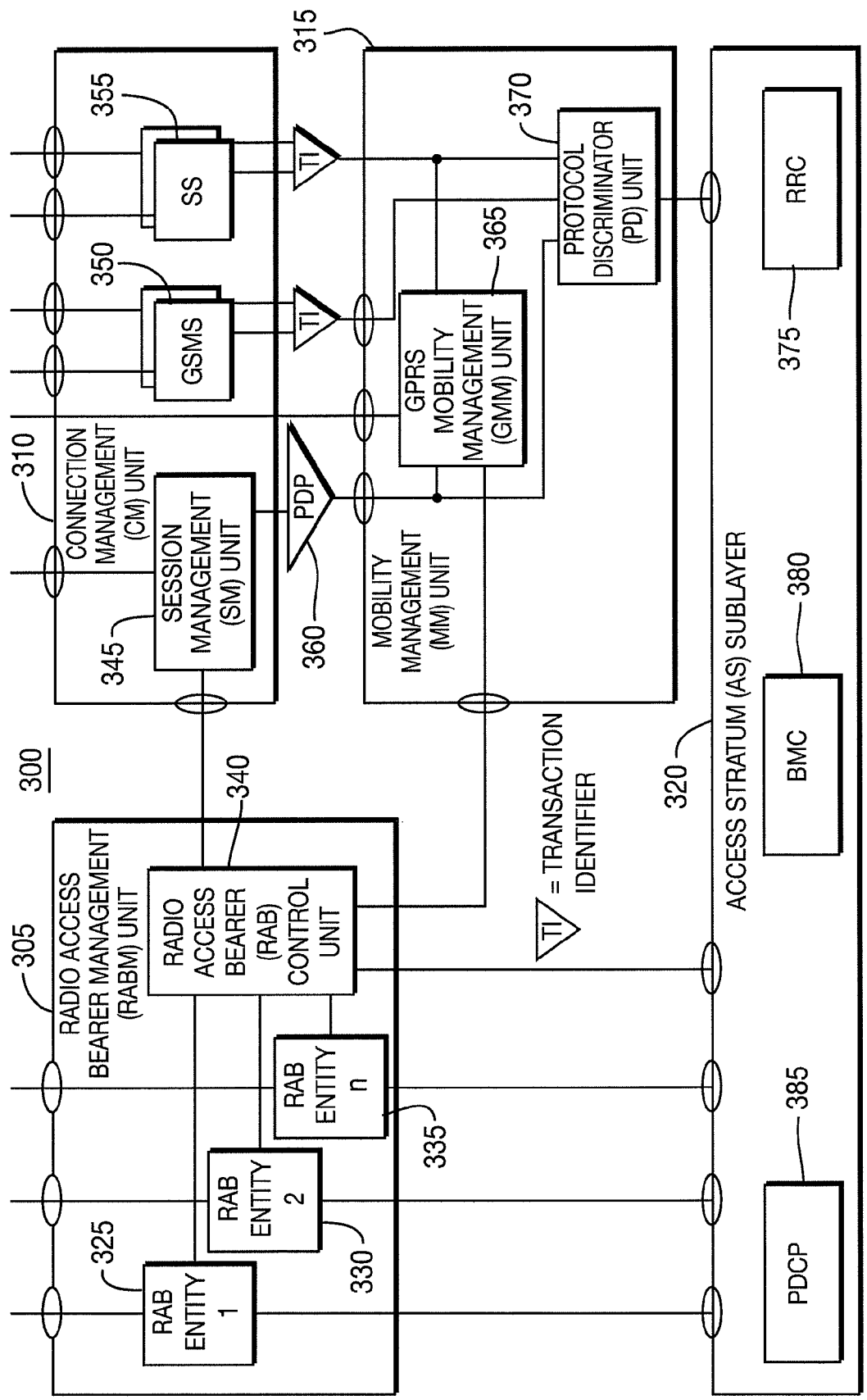
FIG. 3 shows a conventional NAS architecture of a PS-only UMTS WTRU.
Figure 5:
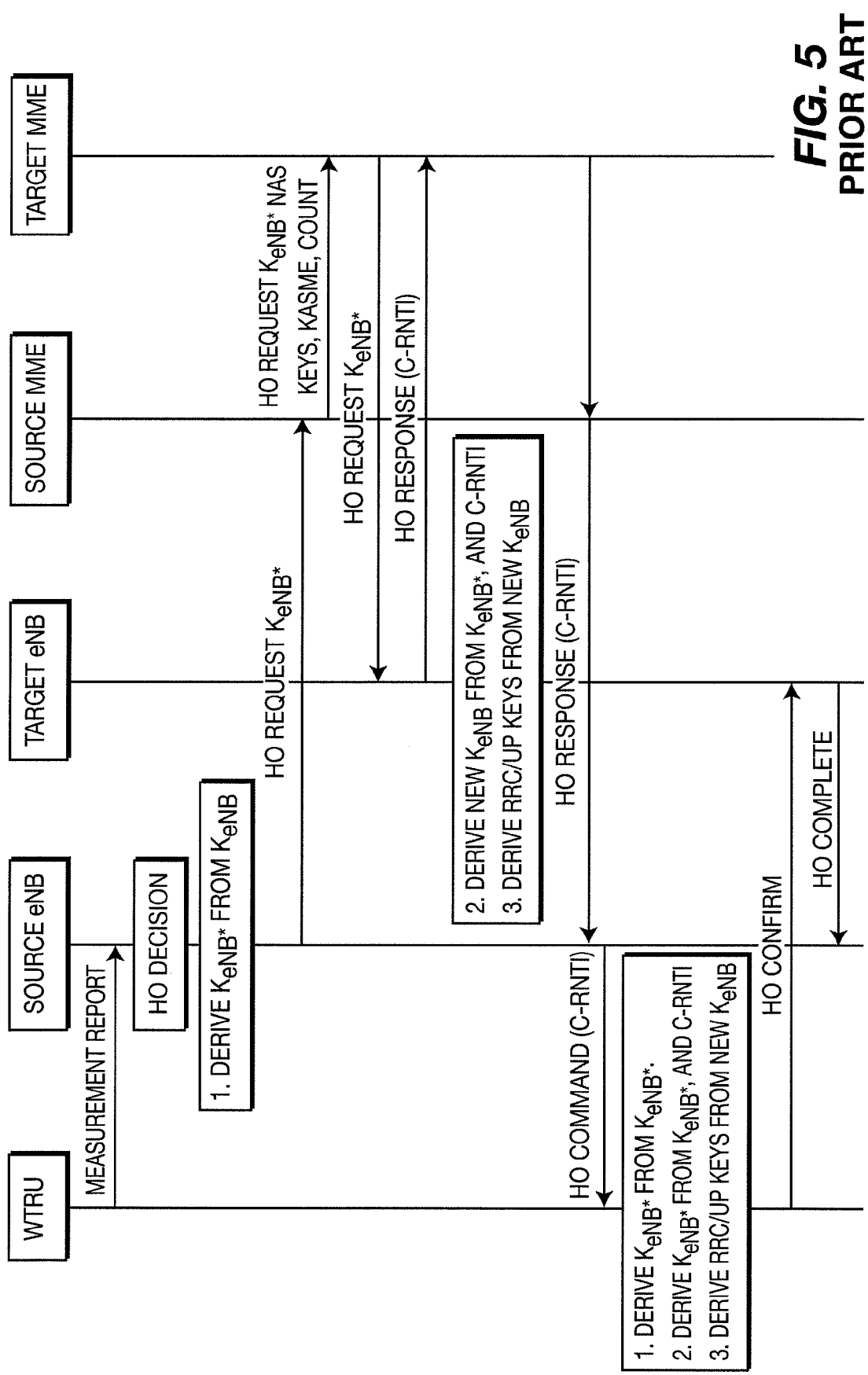
FIG. 5 shows an example of a conventional inter-MME handover procedure.

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Enhancement to Layer 3 Protocol Discriminator (PD) Field

Referring to FIG. 1, the L3 PD field 110 in the LTE L3 header 100 may be enhanced, such that a specific combination of the bits in the L3 PD field 110 indicates that the L3 message that follows the LTE LE header 100 is an upper layer LTE L3 message, (e.g., EMM, ESM).

The terms EMM and ESM are used to describe the LTE MM and SM entities and protocols, and their associated functions. If any additional entities/protocols are defined/modified in the NAS layer for LTE, their respective protocol may also be added to the L3 PD field. However, as shown in FIG. 2, there are very few bit combinations available to do so. Hence, the following options may be implemented:

1) Define the spare PD values '0111' and '1101' to denote EMM and ESM protocols (in any order);
2) Extend the PD field to be one octet (or more) and map two values (of the available values that this increased PD field may take) to EMM and ESM protocols;
3) Re-use some existing PD values, (e.g., 1000 for GMM messages), to indicate the EMM and ESM protocols.

Enhancement to Message Type Description

Referring to FIG. 1, the second octet of the LTE L3 header 100 includes a message type field 115. The different values of this octet map to different messages of the protocol layer identified by the protocol discriminator field 110.

In order to define the new L3 NAS messages that are expected for LTE, additional values in the message type field 115 may be assigned for the following:

1) Tracking Area Update Request;
2) Tracking Area Update Accept;
3) Tracking Area Update Complete;
4) Tracking Area Update Reject;
5) NAS Security Mode Command;
6) NAS Security Mode Command Complete; and
7) NAS Security Mode Command Failure.

New Integrity Check (IC) Information Element in NAS Messages

For integrity checking a NAS message, a new NAS integrity check (IC) IE may be appended to each NAS message. The receiver compares the value of this received IE with its own computation. Since the length of the IC bits is likely to be fixed, (as it is the output of a known algorithm), the IC IE may be encoded as a type 3 NAS message IE, (type and value (TV) only), as the length of the value part is fixed. Alternatively, it may be encoded as a type 2 or some other type. A new IE identifier may be defined to identify the NAS IC IE.

New Architecture for Securing the NAS Layer

The following different architectures are described for securing the NAS layer.

New NAS Entity/Protocol for Security

Figure 6:
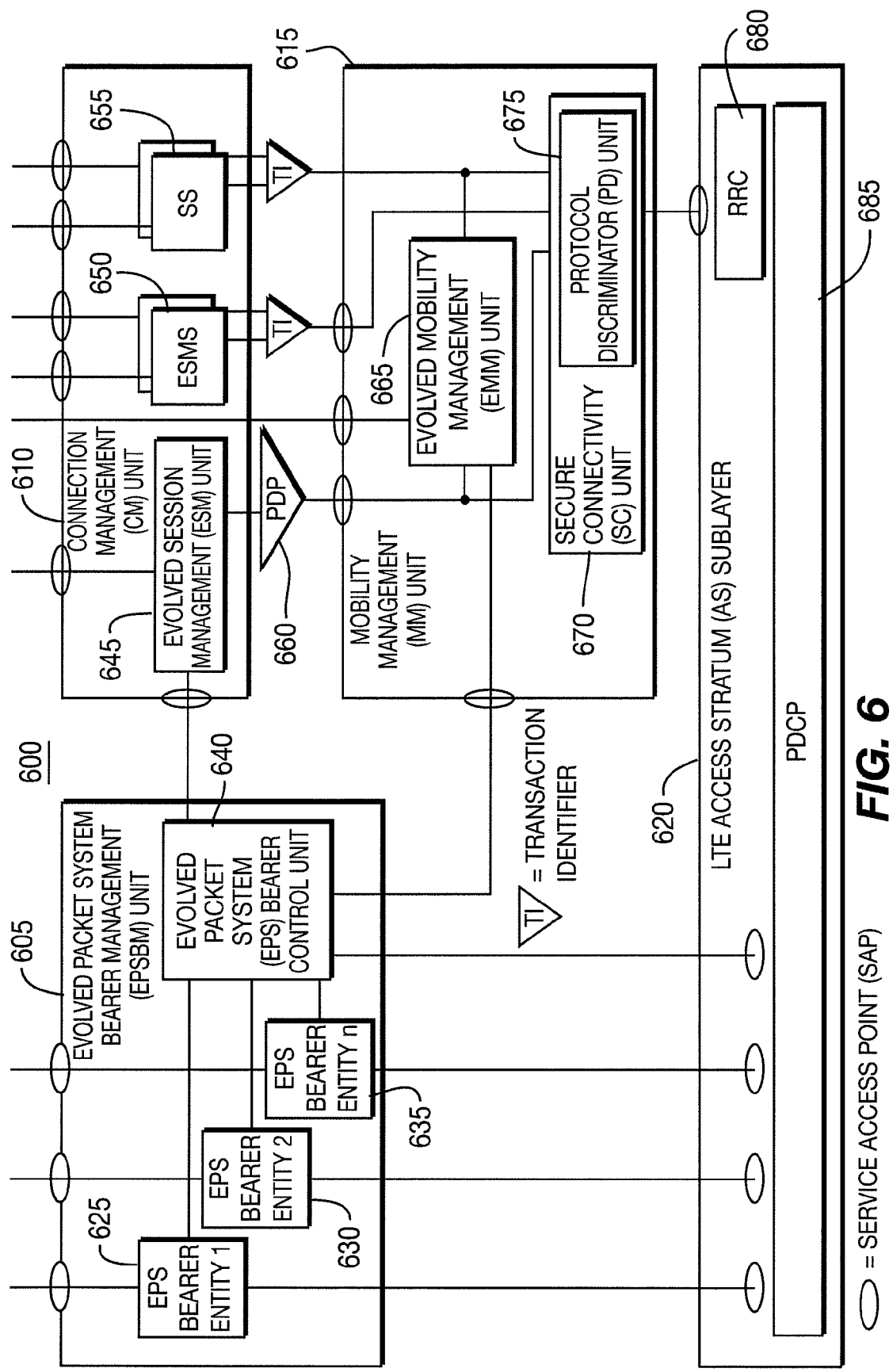
FIG. 6 shows an example of a new NAS architecture.

FIG. 6 shows an example of a new NAS L3 architecture 600, which may reside within a WTRU, (i.e., a mobile station). The NAS L3 architecture 600 includes an evolved packet system bearer management (EPSBM) unit 605, a CM unit 610, an MM unit 615 and an LTE AS sublayer 620. The EPSBM unit 605 includes a plurality of evolved packet system (EPS) bearer entities 625, 630 and 635, and an EPS control unit 640. The CM unit 610 includes an evolved session management (ESM) unit 645, an evolved short message service (ESMS) entity 650, and a supplemental service (SS) entity 655. A PDP 660 is used as an interface between the CM unit 610 and the MM unit 615. The MM unit 615 includes an evolved mobility management (EMM) unit 665 and a secure connectivity (SC) unit 370. The SC unit 370 includes a PD unit 375. Both the MM unit 615 and the EPSBM unit 605 interface with the LTE AS sublayer 620, which includes an RRC 680 and a PDCP 685.

The EPS bearer entities 625, 630 and 635 run between the WTRU and a packet data node (PDN) gateway and consists of the combination of a radio bearer (RB) and an EPS access bearer. The EPSBM unit 605 controls the modification and configuration of the EPS bearers. The LTE AS sublayer 620 provides services to the MM unit 615 and the EPSBM unit 605. The ESM unit 645 provides services to the EPSBM unit 605 and uses services of the MM unit 615. The ESMS entity 650 is identical to the SMS entity for GPRS services in GSM, except it uses the services from the EMM unit 665. The SS entity 655 is identical to the one for non-GPRS services, except it uses the services from the PS signaling connection.

The SC unit 670 is used such that all messages from the EMM unit 665 and the ESM unit 645 pass through the SC unit 670 to the LTE AS sublayer 620. The SC unit 670 may be viewed as a sub-entity of the MM unit 615 as shown in FIG. 6, or it may be viewed as an L3 entity separate from the MM unit 615. The functionalities of the SC unit 670 may also reside in lower layers, (e.g., RRC 680), and it may also be defined to have its own protocol.

Functionally, any combination of the following may be implemented:

1) The EMM, ESM and other entities (e.g., SMS) may send messages to the SC unit 670.

2) SAPs and associated primitives may be defined for the EMM unit 665 and the SC unit 670, and the ESM unit 645 and the SC unit 670.

3) The SC unit 670, (or more generally the NAS), may define a NAS security state variable, (e.g., 1 bit), that denotes whether currently NAS security is active or not. It is possible to have two such variables to distinguish between ciphering and integrity protection. Note that instead of 1 bit NAS security state variable, primitives may be exchanged between the NAS and the RRC to indicate presence or absence of ciphering. Also the one bit could also be considered a separate PDU that is used to indicate that ciphering has begun, (e.g., a separate NAS message may be used for this purpose). Alternatively, this one bit may be included in every NAS PDU.

4) The SC unit 670 may operate in either a transparent mode or a non-transparent mode. In the transparent mode, the SC unit 670 will not cipher/de-cipher and/or integrity check a particular NAS message. This decision may be based on any combination of the following factors: the protocol discriminator of the message, an indicator field in the L3 protocol header, (indicating requirement of ciphering and/or integrity protection for the particular PDU), the message type, the NAS security state variable, an indication by an upper layer protocol, (e.g., an indication from the EMM unit 665 and/or the ESM unit 645 to the SC unit 670 to not cipher/integrity check this message).

5) In non-transparent mode, the SC unit 670 may cipher/de-cipher and/or integrity check the relevant NAS PDU. This decision may also be based on any combination of the following factors: the protocol discriminator of the message, an indicator field in the L3 protocol header, (indicating a requirement of ciphering and/or integrity protection for the particular PDU), the message type, the NAS security state variable, an indication by an upper layer protocol, (e.g., an indication from the EMM unit 665 and/or the ESM unit 645 to the SC unit 670 to not cipher/integrity check this message).

6) On the receiving side, the SC unit 670 may receive a NAS PDU from lower layers and, if operating in the transparent mode, route it based on its protocol discriminator to the correct upper layer entity, (e.g., EMM/ESM). If the receiving SC unit 670 is in the non-transparent mode, it may cipher and/or integrity check the NAS PDU, increment its NAS SN and/or NAS HFN, and then route the message based on the PD field of the NAS header. The receive side may either de-cipher and then check the integrity of the message or vice versa depending on the order of these operations in the transmit side.

As previously described, it may be possible to have a separate protocol for the SC unit 670. Such a protocol may be distinguished by having its own protocol discriminator field in the L3 header. The message types belonging to this protocol could be those related to ciphering, authentication, identification and key agreement among others. Examples include:

1) Identity Request;
2) Identity Response;
3) Authentication Request;
4) Authentication Response;
5) Authentication Failure;
6) Authentication Reject;
7) NAS Security Mode Command;
8) NAS Security Mode Command Complete; and
9) NAS Security Mode Command Failure.

It may also be possible to define a state machine for this entity. As an example, the following describes possible states (other names for these states and other states may be possible):

a) SECURITY INACTIVE: In this state, the WTRU is not authenticated to the network and no security context exists in the WTRU or in the network. As a sub-state of this state (or as separate states) one may have states denoting an ongoing AKA session, NAS security mode command exchange, and RRC security mode command exchange.

b) SECURITY ACTIVE: In this state, the WTRU is authenticated to the network and a security context exists in the WTRU and in the network. The WTRU may have some keys (e.g., $K_{asme}$) or all keys.

It may also be possible to implement this same SCE in a different, although in a more complicated, manner. For example, on the transmit side, the upper layer calling entities, (such as the EMM unit 665 or the ESM unit 645), having constructed the NAS PDU, may send it to the NAS SC unit 670. The NAS SC unit 670 may then cipher and/or integrity check the PDU and then return it to the calling entity. The calling entity may then send the secured NAS PDU to the lower layer (i.e., RRC). This method has an advantage of reusing existing SAPs between the MM unit 615 and the LTE AS sublayer 620. On the receive side, however, the message is de-ciphered and integrity checked before it can be routed to the correct upper-layer protocol entity. This functionality may be achieved by routing all received NAS PDUs to the SC unit 670, which then makes the routing decision.

Another option is that each NAS layer does the ciphering/integrity-protection of the messages in its own protocol. Thus, the EMM unit 665 may cipher/integrity check/decipher EMM messages, and the ESM unit 645 may cipher/integrity check/decipher ESM messages, and so on. The role of the SC unit 670 in this case may be limited to providing sequence numbers to the EMM and ESM layers, (and any other layers), so that there is no collision of SNs being used. This problem may disappear by defining the SNs to increment, on a per protocol PDU basis, instead of on a per NAS PDU basis. In this case, each NAS sub-layer, (e.g., EMM/ESM), may have its own SN/HFN which is incremented for every NAS PDU belonging to this protocol. In this version, on the receive side, the routing entity in the NAS layer may route a received NAS PDU to the correct NAS entity based on the protocol discriminator field in the NAS header, (assuming that it is not ciphered), and then the respective protocol entity may decipher and/or integrity check the message.

Determination of the Length of the NAS PDU

The NAS layer may provide the length of the portion of the NAS PDU (to be de-ciphered) to the ciphering engine. The following are different options for determining this length.

1) The transmit NAS entity may include an indication of the length in the L3 message, (e.g., in the protocol header). This length may be the length of the entire message, the ciphered portion of the message or some other value that allows the receiving NAS entity to determine the length of the keystream block that needs to be generated.

2) The transmit NAS entity may include an indication of the length of the L3 message to the RRC when it passes an L3 message for transmission. This length indication is received by the RRC layer in the receiver and passed on to the receiver NAS entity, where it is used to determine the length of the keystream block to be generated.

3) Currently, the NAS layer expects complete NAS PDUs without re-segmentation being performed at the NAS layer. As a result, when a NAS PDU is received, the receiving entity may be confident that it is complete, (its behavior if it receives a message missing expected values is currently to discard the message). Thus, it is possible to leave the determination of the length of the NAS PDU up to implementation.

An example implementation in the receiver is given below:
1) a NAS PDU is received;
2) the NAS PDU is stored in a memory/buffer or equivalent;
3) the size of the message is determined, (e.g., memory/buffer space occupied);
4) the length of the ciphered portion of the message is determined by subtracting the length of the un-ciphered portion of the message from the size of the message. The length of the un-ciphered portion of the message may be fixed or may vary in a known pattern, (e.g., depending on the message type/protocol) or may be configured by the transmit NAS entity in the receiving NAS entity; and
5) the length of the ciphered portion is passed to the ciphering algorithm to determine the keystream to be used for de-ciphering.

Handling Of NAS SN And HFN Upon Radio Link Failure And Handover

As part of these procedures it is necessary to determine how the current NAS SN and HFN number is processed in the network.

During handover, any of the following may be performed with the NAS SN and HFN currently in the WTRU and the source MME.

1) They may both be reset to a default value.
2) The NAS HFN may not be reset but the NAS SN may be reset. The NAS HFN is passed by the source MME to the target as part of the handover (HO) request.
3) The NAS SN may not be reset but the NAS HFN may be reset. The NAS SN is passed by the source MME to the target as part of the HO request.
4) Neither the NAS HFN nor the NAS SN may be reset. They are both passed by the source MME to the target as part of the HO request.

The other question that needs to be answered is that, if any of the parameters, (NAS SN and/or HFN), are being reset, when this reset is triggered and how are the new NAS/ASME keys passed to the WTRU.

Therefore, during inter-MME handover, a NAS message is triggered from the source MME to the WTRU providing the parameters necessary for deriving the new NAS and ASME keys. Alternatively, the source MME may provide the WTRU with the new NAS and ASME keys in a secure way, (using existing ciphering/integrity protection). As an example, this message may be a NAS Security Mode Command/Reconfiguration. This NAS message may be sent prior to handover command, (e.g., in a separate downlink direct transfer message), or as an L3 message within the handover command. As another alternative, this information may be sent directly in a RRC message.

The reset of the NAS SN and/or HFN may be triggered by a lower layer indication of handover imminent, (e.g., when the RRC receives a handover command), or by the receipt of said separate NAS message.

Handling of NAS SN and HFN Upon Radio Link Failure and Inter-eNodeB Handover

For a radio link (RL) failure and inter-eNodeB handover in the uplink (UL) and downlink (DL). the NAS SN and/or the HFN may be reset. This may be triggered by the transmission or reception of a message, (e.g., an RRC message).

Handling of Retransmissions at NAS

In case of retransmissions, the NAS layer may detect whether the packet that is transmitted again is a duplicate PDU (a PDU that is already received) or a new PDU. The duplicate detection entity could be a common entity sitting below the EMM or the ESM, and monitoring whether the incoming packets have been sent before or not. In the event that an acknowledgement was not received for a transmitted NAS PDU, lower layers may provide an indication of this to the NAS layer. The NAS layer may use this indication to re-transmit the PDU, (or send a new PDU), with the same SN.

In case duplicate detection is not allowed, the same sequence number may be used for transmitting the data in case of a failed transmission as opposed to transmitting the data with a new sequence number.

Alternatively or in addition, the NAS transaction identifier may be used by the NAS to detect duplicate messages. This may require the NAS transaction ID to be part of the NAS header. Thus, the WTRU may be able to read this ID and discard any duplicate messages received.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method of processing non-access stratum (NAS) messages in a wireless transmit/receive unit (WTRU), the method comprising:
   generating a NAS message and a NAS header that includes a NAS security state variable;
   determining, whether to cipher the NAS message based on the NAS security state variable, wherein NAS security is active for the NAS message and the NAS message is ciphered on a condition that the NAS security state variable has a first value, and wherein the NAS security is not active for the NAS message and the NAS message is not ciphered on a condition that the NAS security state variable has a second value; and
   routing the NAS message based on a protocol discriminator (PD) field of a NAS header.

2. The method of claim 1 wherein the NAS message is a Long Term Evolution (LTE) evolved mobility management (EMM) message or a LTE evolved session management (ESM) message.

3. The method of claim 1 wherein the NAS message comprises a NAS protocol data unit (PDU).

4. The method of claim 3 wherein an encoded NAS PDU indicates that ciphering is currently active.

5. The method of claim 1 wherein the NAS security state variable comprises a bit.

6. The method of claim 1 wherein the PD value is specific for EMM or ESM NAS message.

7. A wireless transmit/receive unit (WTRU) comprising:
   a processor configured to generate a non-access stratum (NAS) message and a NAS header that includes a NAS security state variable and determine whether to cipher the NAS message based on the NAS security state variable, wherein NAS security is active for the NAS message and the NAS message is ciphered on a condition that the NAS security state variable has a first value, and wherein the NAS security is not active for the NAS message and the NAS message is not ciphered on a condition that the NAS security state variable has a second value; and
   a processor is further configured to route the NAS message based on a protocol discriminator (PD) field of a NAS header.

8. The WTRU of claim 7 wherein the NAS message is a Long Term Evolution (LTE) evolved mobility management (EMM) message or a LTE evolved session management (ESM) message.

9. The WTRU of claim 7 wherein the NAS message comprises a NAS protocol data unit (PDU).

10. The WTRU of claim 9 wherein an encoded NAS PDU indicates that ciphering is currently active.

11. The WTRU of claim 8 wherein the NAS security state variable comprises a bit.

12. The WTRU of claim 8 wherein the PD value is specific for EMM or ESM NAS message.

13. A method of processing non-access stratum (NAS) messages in a wireless transmit/receive unit (WTRU), the method comprising:
   receiving a NAS message having a NAS header that includes a NAS security state variable;
   determining, whether to de-cipher the NAS message based on the NAS security state variable, wherein NAS security is active for the NAS message and the message is de-ciphered on a condition that the NAS security state variable has a first value, and wherein the NAS security is not-active for the NAS message on a condition that the NAS security state variable has a second value; and
   routing the NAS message based on a protocol discriminator (PD) field of a NAS header.

14. The method of claim 13 wherein the NAS message is a Long Term Evolution (LTE) evolved mobility management (EMM) message or a LTE evolved session management (ESM) message.

15. The method of claim 13 wherein the NAS message comprises a NAS protocol data unit (PDU).

16. The method of claim 15 wherein an encoded NAS PDU indicates that de-ciphering is currently active.

17. The method of claim 13 wherein the NAS security state variable comprises a bit.

18. The method of claim 13 wherein the PD value is specific for EMM or ESM NAS message.

19. A wireless transmit/receive unit (WTRU) comprising:
a processor configured to receive a non-access stratum (NAS) message having a NAS header that includes a NAS security state variable, and to determine whether to de-cipher the NAS message based on the NAS security state variable, wherein NAS security is active for the NAS message and the NAS message is deciphered on a condition that the NAS security state variable has a first value, and wherein the NAS security is not-active for the NAS message on a condition that the NAS security state variable has a second value; and
a processor is further configured to route the NAS message based on a protocol discriminator (PD) field of a NAS header.

20. The WTRU of claim 19 wherein the NAS message is a Long Term Evolution (LTE) evolved mobility management (EMM) message or a LTE evolved session management (ESM) message.

21. The WTRU of claim 19 wherein the NAS message comprises a NAS protocol data unit (PDU).

22. The WTRU of claim 21 wherein an encoded NAS PDU indicates that ciphering is currently active.

23. The WTRU of claim 19 wherein the NAS security state variable comprises a bit.

24. The WTRU of claim 19 wherein the PD value is specific for EMM or ESM NAS message.

* * * * *